United States Patent
Bunting, Jr. et al.

(10) Patent No.: US 10,537,866 B2
(45) Date of Patent: Jan. 21, 2020

(54) SCALE COLLECTION DEVICE FOR DOWNFLOW REACTORS

(71) Applicant: UOP LLC, Des Plaines, IL (US)

(72) Inventors: Robert L. Bunting, Jr., Chicago, IL (US); Steven J. Lesniak, Chicago, IL (US); Zhanping Xu, Inverness, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 16/221,071

(22) Filed: Dec. 14, 2018

(65) Prior Publication Data

US 2019/0232243 A1 Aug. 1, 2019

Related U.S. Application Data

(60) Provisional application No. 62/609,313, filed on Dec. 21, 2017.

(51) Int. Cl.
*B01J 8/00* (2006.01)
*B01D 24/12* (2006.01)

(52) U.S. Cl.
CPC ............ *B01J 8/0085* (2013.01); *B01D 24/12* (2013.01); *B01J 8/006* (2013.01); *B01D 2101/00* (2013.01); *B01J 2204/002* (2013.01)

(58) Field of Classification Search
CPC .......... B01J 8/0085; B01J 8/008; B01J 8/006; B01D 24/12
See application file for complete search history.

(56) References Cited

U.S. PATENT DOCUMENTS

| | | | |
|---|---|---|---|
| 3,607,000 A | * | 9/1971 | Beal ................... B01J 8/0453 208/216 R |
| 4,380,529 A | | 4/1983 | Gupta |
| 4,836,989 A | | 6/1989 | Aly et al. |
| 5,484,578 A | | 1/1996 | Muldowney et al. |
| 8,181,942 B2 | | 5/2012 | Sechrist |
| 8,487,151 B2 | | 7/2013 | Koudil et al. |
| 8,673,246 B2 | | 3/2014 | Chen et al. |
| 9,364,810 B2 | | 6/2016 | Merkel et al. |
| 9,480,957 B2 | * | 11/2016 | Bazer-Bachi ......... B01J 8/0492 |
| 2011/0201856 A1 | * | 8/2011 | Cottard ................... B01J 8/006 585/250 |

(Continued)

FOREIGN PATENT DOCUMENTS

| | | |
|---|---|---|
| CN | 103131472 A | 6/2013 |
| WO | 2006076923 A1 | 7/2006 |

(Continued)

OTHER PUBLICATIONS

International Search Report and Written Opinion from corresponding PCT Application No. PCT/US2018/066666, dated Apr. 4, 2019.

(Continued)

*Primary Examiner* — Lessanework Seifu

(57) ABSTRACT

The invention involves a scale collection device that is located within downflow reactor head for removing solids from feed streams to increase reactor operating cycle time without impact on effective reactor space for catalyst loading. More particularly, a filtering zone is located in an upper portion of a reactor vessel above a rough liquid distribution tray and a distribution tray.

17 Claims, 1 Drawing Sheet

(56) References Cited

U.S. PATENT DOCUMENTS

2017/0015917 A1* 1/2017 Muller .................. B01J 8/0492

FOREIGN PATENT DOCUMENTS

| | | |
|---|---|---|
| WO | 2007023225 A1 | 3/2007 |
| WO | 2015036066 A1 | 3/2015 |

OTHER PUBLICATIONS

International Search Report and Written Opinion from corresponding PCT Application No. PCT/US2018/066659, dated Mar. 28, 2019.
International Search Report and Written Opinion from corresponding PCT Application No. PCT/US2018/066684, dated Mar. 21, 2019.
International Search Report and Written Opinion from corresponding PCT Application No. PCT/US2018/066663, dated Mar. 28, 2019.
International Search Report and Written Opinion from corresponding PCT Application No. PCT/US2018/066678, dated Apr. 4, 2019.
International Search Report and Written Opinion from corresponding PCT Application No. PCT/US2018/066682, dated Apr. 4, 2019.

* cited by examiner

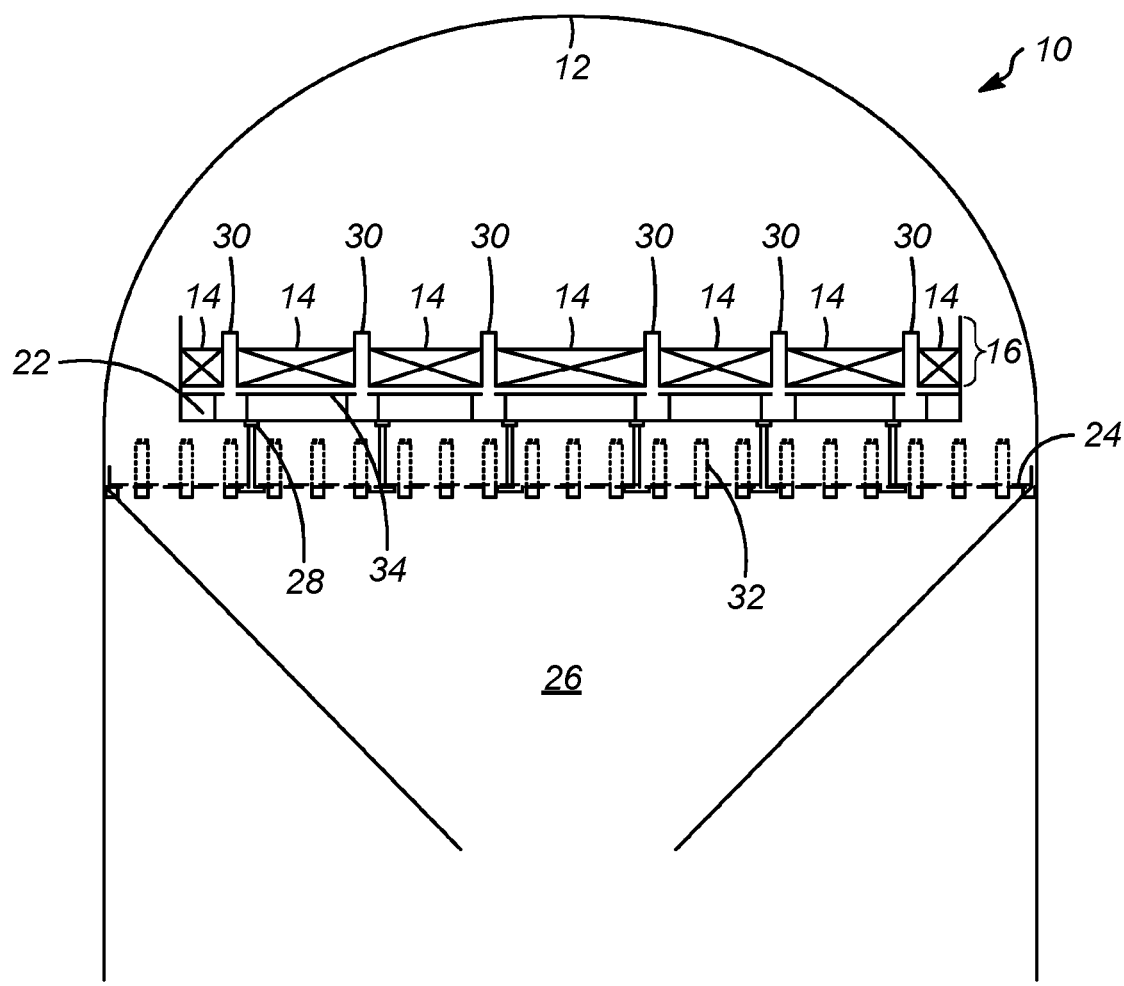

SCALE COLLECTION DEVICE FOR DOWNFLOW REACTORS

CROSS-REFERENCE TO RELATED APPLICATION

This application claims priority from U.S. Provisional Application No. 62/609,313 filed Dec. 21, 2017, the contents of which cited application are hereby incorporated by reference in its entirety.

FIELD OF THE INVENTION

The invention relates to a device for improved operation of downflow reactors. More particularly, the invention involves a scale collection device that is located within downflow reactor head for removing solids from feed streams to increase reactor operating cycle time without impact on effective reactor space for catalyst loading.

BACKGROUND OF THE INVENTION

In downflow reactors, such as downflow reactors, a layer of filtering material is often placed on top of the first catalyst bed to catch particles such as fines and scales. Typically, this layer may be 6 to 36 inches thick and reduces the space available for the catalyst to occupy. In addition, the filtering material has to be removed and replaced within an operating cycle when solids accumulate within the layer of filtering material or between the filtering material and catalyst bed causing a high pressure drop.

SUMMARY OF THE INVENTION

The invention involves a reactor comprising an upper portion and a lower portion wherein the upper portion contains a scale collection device. A filtering zone is located above and within a rough liquid distribution tray and wherein a vapor-liquid distribution tray is located below said rough liquid distribution tray and wherein the lower portion contains a catalyst bed. The filtering zone may comprise a single layer or multiple layers of filtering materials having the same or different physical and chemical properties. The filtering zone contains porous ceramic pellets or other materials that achieve a similar function. The filtering zone may be spaced above the rough liquid distribution tray by a plurality of spacers.

BRIEF DESCRIPTION OF THE DRAWING

The FIGURE shows the upper portion of a reactor showing filtering material located above the distribution trays.

DETAILED DESCRIPTION OF THE INVENTION

It has now been found that a different arrangement is preferred to filter particles from a feedstream in a downflow reactor. In addition to having a layer of filtering material on top of the catalyst, it has been found advantageous to include a layer of filtering material in the upper portion of the reactor above the distribution trays. More particularly, a scale collection device is located within an upper portion of a downflow reactor or reactor head for removing solids from feed streams and to increase reactor operating cycle time without any impact on the amount of effective reactor space for catalyst loading. This is achieved by a specially designed scale collection device located within a reactor head. As shown in the FIGURE, the scale collection device is located within a rough liquid distribution tray (RLDT) constructed with a cylindrical side wall and a perforated bottom plate and media support/spacer at bottom of the scale collection device spaced a small distance above the RLDT perforated bottom plate. A filtering material fills the space above the media support/spacer and inside the cylindrical side wall. There may be a hold-down grid at top of the filtering material to keep it from moving around. Multiple chimneys are attached to the media support/spacer and extended up above the filtering material for liquid overflow in case that the filter bed is plugged with solids restricting liquid flow through the bed. The overflow liquid is delivered to the perforated rough liquid distribution tray below the filter media for redistributing liquid across the tray to a vapor-liquid distribution tray below.

Gas and liquid enter into the reactor through an inlet distributor. The inlet flow stream may be straightened vertically downwards by an orifice plate or other means at top of the distributor. The liquid is distributed across the top of the filtering material. Gas is separated from liquid in the space between the inlet distributor and top of the filtering material. The liquid flows downward through the filtering material while the gas flows through an open annular area between the cylindrical side wall of the scale collection device and reactor head. With gas bypassing the filtering material, the pressure drop will not increase even with the filtering material filled with solids.

With this design, the reactor cycle time can be increased by the additional filter bed within the top reactor head or increased catalyst loading by reducing the filter material on top of the catalyst bed. Liquid should be distributed uniformly across the top of the filter bed to maximize the solid removal capability of the scale collection device.

The liquid exiting the scale collection device is redistributed by the rough liquid distribution tray below. Gas and liquid are then distributed through a vapor-liquid distribution tray in fluid communication with the rough liquid distribution tray to the catalyst bed.

As shown in the FIGURE, according to one or more embodiments of the present invention, in order to remove the scales and fines in a fluid stream from within reactor 10 is shown an outer reactor shell having a rounded upper portion 12. The lower portion of reactor 10 contains a catalyst bed 26. The rough liquid distribution tray 22 has a cylindrical wall 16 and a perforated bottom plate. The RLDT and the scale collection device are supported by supports 28. Sections of media support/spacers 34 are placed on the perforated bottom plate and make up the bottom of the scale collection device so that the perforations are not blocked by the filtering material. The media support/spacers 34 used in the scale collection device, such as grating, profile wire, or wire mesh, is mostly open (over 50%) for liquid to flow through to the rough liquid distribution tray. Multiple chimneys 30 are attached to and extend through the media support/spacer 34 and extended up above the filtering material for liquid overflow in the event that the filtering bed is plugged by solids. The overflow chimneys 30 may contain slots, cuts or holes to handle the overflowing liquid. A V-shape or narrow vertical slot allows liquid to flow into the chimneys more uniformly over a range of liquid flow rates. Caps or hoods can also be placed over the chimneys to prevent liquid from entering directly into a chimney without passing through the filtering material. The liquid then passes down from rough liquid distribution tray to a vapor-liquid distribution tray 24 that is shown as having a number of distributors 32.

Gas and liquid then pass below into catalyst bed 26. The media support/spacer provides minimal resistance to radial liquid flow on rough liquid distribution tray so that liquid can be re-distributed across the tray. A plurality of supports 28 are used to support both the RLDT/scale collection device 22 and the vapor-liquid distribution tray 24.

The filter material 14 used in the filtering zone may comprise pellets, sheets or other configuration of a porous material as known in the art. Preferred materials for the filtering zone are ceramic pellets which have a high internal porosity, such as the products available from Crystaphase Technologies, Inc., located in Houston, Tex. US. The filtering zone may contain multiple layers of filtering materials with various geometries and dimensions and different internal pore sizes. Other filtering materials may be used, for example, membrane filters, sand filters, and other similar filter materials. The media support or media support with a wire mesh sheet above, upon which the porous material is supported has openings that are smaller than the size of the porous material pellets or other configuration.

With respect to the collection of the solid materials from the inlet fluid, the configuration also reduces the tendency of rough liquid distribution tray 22, and vapor-liquid distribution tray 24 being plugged by solids. The quality of liquid distribution through the rough liquid distribution tray 22 and vapor-liquid distribution tray 24 was also found improved due to the reduced turbulence of liquid on the rough liquid distribution tray due to the scale collection device above the rough liquid distribution tray 22.

SPECIFIC EMBODIMENTS

While the following is described in conjunction with specific embodiments, it will be understood that this description is intended to illustrate and not limit the scope of the preceding description and the appended claims.

A first embodiment of the invention is an apparatus comprising an upper portion and a lower portion wherein the upper portion contains a scale collection device wherein a filtering zone is located above a rough liquid distribution tray, wherein a vapor-liquid distribution tray is located below the rough liquid distribution tray and wherein the vapor-liquid distribution tray comprises a plurality of distributors which separate a filter media bed. An embodiment of the invention is one, any or all of prior embodiments in this paragraph up through the first embodiment in this paragraph, wherein the filtering zone comprises a first portion in an upper region comprising porous pellets having larger pores than a second portion in a lower region of the filtering zone. An embodiment of the invention is one, any or all of prior embodiments in this paragraph up through the first embodiment in this paragraph, wherein the filtering zone comprises porous ceramic pellets. An embodiment of the invention is one, any or all of prior embodiments in this paragraph up through the first embodiment in this paragraph, wherein the filtering zone is spaced above the rough liquid distribution tray by a plurality of spacers. An embodiment of the invention is one, any or all of prior embodiments in this paragraph up through the first embodiment in this paragraph, wherein the spacers are coupled to the rough liquid distribution tray and the vapor-liquid distribution tray. An embodiment of the invention is one, any or all of prior embodiments in this paragraph up through the first embodiment in this paragraph, wherein the filter media bed support comprises profile wire. An embodiment of the invention is one, any or all of prior embodiments in this paragraph up through the first embodiment in this paragraph, wherein the filter media bed support comprises grating. An embodiment of the invention is one, any or all of prior embodiments in this paragraph up through the first embodiment in this paragraph, wherein the filter media bed support comprises grating and wire mesh. An embodiment of the invention is one, any or all of prior embodiments in this paragraph up through the first embodiment in this paragraph, wherein the floor of the apparatus comprises a perforated plate. An embodiment of the invention is one, any or all of prior embodiments in this paragraph up through the first embodiment in this paragraph, wherein the overflow chimneys contain slots, wherein the slots may be v-shaped. An embodiment of the invention is one, any or all of prior embodiments in this paragraph up through the first embodiment in this paragraph, wherein the overflow chimneys contain vertical or angled cuts. An embodiment of the invention is one, any or all of prior embodiments in this paragraph up through the first embodiment in this paragraph, wherein the overflow chimneys contain holes. An embodiment of the invention is one, any or all of prior embodiments in this paragraph up through the first embodiment in this paragraph, wherein the overflow chimneys may comprise bubble caps. An embodiment of the invention is one, any or all of prior embodiments in this paragraph up through the first embodiment in this paragraph, wherein the rough liquid distribution tray contains holes sized to generate the desired liquid level on the rough liquid distribution tray.

A second embodiment of the invention is an apparatus comprising an upper portion and a lower portion wherein the upper portion contains a scale collection device wherein a filtering zone is located above a rough liquid distribution tray, wherein a vapor-liquid distribution tray is located below the rough liquid distribution tray and wherein the vapor-liquid distribution tray comprises a plurality of distributors which separate a filter media bed. An embodiment of the invention is one, any or all of prior embodiments in this paragraph up through the second embodiment in this paragraph, wherein the filtering zone comprises a first portion in an upper region comprising porous pellets having larger pores than a second portion in a lower region of the filtering zone. An embodiment of the invention is one, any or all of prior embodiments in this paragraph up through the second embodiment in this paragraph, wherein the filtering zone comprises porous ceramic pellets. An embodiment of the invention is one, any or all of prior embodiments in this paragraph up through the second embodiment in this paragraph, wherein the filtering zone is spaced above the rough liquid distribution tray by a plurality of spacers. An embodiment of the invention is one, any or all of prior embodiments in this paragraph up through the second embodiment in this paragraph, wherein the rough liquid distribution tray contains holes sized to generate the desired liquid level on the rough liquid distribution tray.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims. In the foregoing, all temperatures are set forth in degrees Celsius and, all parts and percentages are by weight, unless otherwise indicated.

The invention claimed is:

1. A reactor comprising an upper portion and a lower portion wherein the upper portion comprises:
   a rough liquid distribution tray comprising a cylindrical wall spaced apart from a reactor wall and a perforated bottom plate;
   a scale collection device within the rough liquid distribution tray, the scale collection device comprising a plurality of media support/spacers, the plurality of media support/spacers located on the bottom plate of the rough liquid distribution tray, and the media support/spacers and the cylindrical wall of the rough liquid distribution tray defining a filtering zone; and
   a vapor-liquid distribution tray located below the rough liquid distribution tray and wherein the vapor-liquid distribution tray comprises a plurality of distributors.

2. The reactor of claim 1, wherein the filtering zone comprises a first portion in an upper region comprising porous pellets having larger pores than a second portion in a lower region of the filtering zone.

3. The reactor of claim 1, wherein the filtering zone comprises porous ceramic pellets.

4. The reactor of claim 1, wherein the plurality of media support/spacers are coupled to the rough liquid distribution tray.

5. The reactor of claim 1, wherein the plurality of media support/spacers comprise profile wire.

6. The reactor of claim 1, wherein the plurality of media support/spacers comprise grating.

7. The reactor of claim 1, wherein the plurality of media support/spacers comprise grating and wire mesh.

8. The reactor of claim 1, wherein the plurality of media support/spacers comprises a perforated plate.

9. The reactor of claim 1, further comprising a plurality of overflow chimneys, wherein the overflow chimneys contain slots, wherein the slots may be v-shaped.

10. The reactor of claim 1, further comprising a plurality of overflow chimneys, wherein the overflow chimneys contain cuts.

11. The reactor of claim 1, further comprising a plurality of overflow chimneys, wherein the overflow chimneys contain holes.

12. The reactor of claim 1, further comprising a plurality of overflow chimneys, wherein the overflow chimneys may comprise bubble caps.

13. The reactor of claim 1, wherein the perforated bottom plate of the rough liquid distribution tray contains holes sized to generate the desired liquid level on the rough liquid distribution tray.

14. An apparatus comprising an upper portion and a lower portion wherein the upper portion comprises:
   a rough liquid distribution tray comprising a cylindrical wall spaced apart from a reactor wall and a perforated bottom plate;
   a scale collection device within the rough liquid distribution tray, the scale collection device comprising a plurality of media support/spacers, the plurality of media support/spacers located on the bottom plate of the rough liquid distribution tray, and the media support/spacers and the cylindrical wall of the rough liquid distribution tray defining a filtering zone;
   a plurality of overflow chimneys attached to the media support/spacers and extending upward through the filtering zone; and
   a vapor-liquid distribution tray located below the rough liquid distribution tray and wherein the vapor-liquid distribution tray comprises a plurality of distributors.

15. The apparatus of claim 14, wherein the filtering zone comprises a first portion in an upper region comprising porous pellets having larger pores than a second portion in a lower region of the filtering zone.

16. The apparatus of claim 14, wherein the filtering zone comprises porous ceramic pellets.

17. The apparatus of claim 14, wherein the perforated bottom plate of the rough liquid distribution tray contains holes sized to generate the desired liquid level on the rough liquid distribution tray.

* * * * *